United States Patent
Ciripanga et al.

(10) Patent No.: US 10,783,407 B2
(45) Date of Patent: Sep. 22, 2020

(54) SYSTEM AND METHOD TO DETECT TRAPPED FLEXIBLE MATERIAL

(71) Applicant: GM GLOBAL TECHNOLOGY OPERATIONS LLC, Detroit, MI (US)

(72) Inventors: Radhika Ciripanga, Bangalore (IN); Donald K. Grimm, Utica, MI (US); Wei Tong, Troy, MI (US); David T. Proefke, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 16/037,508

(22) Filed: Jul. 17, 2018

(65) Prior Publication Data

US 2020/0026968 A1    Jan. 23, 2020

(51) Int. Cl.
```
G06K 9/62       (2006.01)
H04N 5/232      (2006.01)
G06K 9/00       (2006.01)
G06T 7/73       (2017.01)
E05F 15/40      (2015.01)
E05F 15/73      (2015.01)
E05B 81/64      (2014.01)
B60Q 9/00       (2006.01)
B60K 28/00      (2006.01)
B60Q 5/00       (2006.01)
```
(52) U.S. Cl.
CPC ............ *G06K 9/6288* (2013.01); *E05F 15/40* (2015.01); *E05F 15/73* (2015.01); *G06K 9/00845* (2013.01); *G06T 7/74* (2017.01); *H04N 5/23238* (2013.01); *B60K 28/00* (2013.01); *B60Q 5/005* (2013.01); *B60Q 9/00* (2013.01); *E05B 81/64* (2013.01); *E05F 2015/767* (2015.01); *E05Y 2900/531* (2013.01); *G06T 2207/30252* (2013.01)

(58) Field of Classification Search
CPC .......... B60K 28/00; B60Q 5/005; B60Q 9/00; E05B 81/64; E05F 15/40; E05F 15/73; E05F 2015/767; E05Y 2900/531; G06K 9/00845; G06K 9/6288; G06T 2207/30252; G06T 7/74; H04N 5/23218; H04N 5/23238
See application file for complete search history.

(56) References Cited

U.S. PATENT DOCUMENTS 9,494,938 B1    11/2016  Kemler
2013/0125468 A1*  5/2013  El Fassi ................. E05F 15/43
                                                         49/26
2015/0281652 A1* 10/2015  Morimoto ............ H04N 7/0806
                                                        348/148

\* cited by examiner

*Primary Examiner* — Manuchehr Rahmjoo (57) ABSTRACT

One general aspect includes a memory configured to include a program and a processor configured to execute the program, where the program enables the processor to: after a first vehicle ingress/egress event, activate a sensor to capture a reference image of a portion of a vehicle body; after a second vehicle ingress/egress event, activate the sensor to capture a test image of the portion of the vehicle body; determine whether the test image includes one or more objects not found in the reference image; and release the door from the body or produce a notification or prevent vehicle movement or some combination thereof, based on the determination of whether the test image includes one or more objects not found in the reference image.

14 Claims, 5 Drawing Sheets

SYSTEM AND METHOD TO DETECT TRAPPED FLEXIBLE MATERIAL

INTRODUCTION

When a vehicle operator/passenger gets into or out of their vehicle, it is not uncommon for a piece of their loose clothing to get caught in the door. For someone getting into a vehicle, this can be a safety hazard because their clothing is now tethered and can tug on them to create a driving distraction or the exposed loose clothing may become soiled while the vehicle is in transit. Alternatively, for someone getting out of a vehicle, this can be a safety hazard because they can trip on their tethered clothing when attempting to walk away from the vehicle or the vehicle may depart while the clothing still attached. Accordingly, it is desirable to provide a system and method that can detect and remedy one's clothing having been trapped between a vehicle door and door frame.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a memory configured to include a program and a processor configured to execute the program, where the program enables the processor to: after a first vehicle ingress/egress event, activate a sensor to capture a reference image of a portion of a vehicle body; after a second vehicle ingress/egress event, activate the sensor to capture a test image of the portion of the vehicle body; determine whether the test image includes one or more objects not found in the reference image; and release a door of the vehicle or produce a notification or prevent vehicle movement or some combination thereof, based on the determination of whether the test image includes one or more objects not found in the reference image. Other embodiments of this aspect include corresponding computer systems, apparatus, and computer programs recorded on one or more computer storage devices, each configured to perform the actions of the methods.

Implementations may include one or more of the following features. The system further including: where, when it is determined that the test image includes one or more objects not found in the reference image, access an image recognition database stored in the memory to recognize the one or more objects included in the test image; and release the vehicle door and/or produce the notification only when the one or more objects only included in the test image are recognized as a certain type. The system where the one or more objects included in the test image are recognized as a trapped portion of flexible material. The system where the determination of whether the test image includes one or more objects not found in the reference image is based on a comparison of the reference image and the test image. The system where: the step that occurs after the second vehicle ingress/egress event is redefined as activate the sensor to capture a plurality of test images of the portion of the vehicle body; and the determination step is redefined by whether the plurality of test images include one or more objects not found in the reference image; and the step in which the vehicle door is released and/or the notification is produced and/or vehicle movement is prevented is redefined by whether the plurality of test images include one or more objects not found in the reference image. The system where the sensor is a wide-angle camera or ultra-wide-angle camera. The system where the notification is a text message configured to be exhibited on a display located in the vehicle. The system where the notification is an at least temporary activation of a vehicle horn. Implementations of the described techniques may include hardware, a method or process, or computer software on a computer-accessible medium.

One general aspect includes a method to detect an occurrence of flexible material being trapped by a vehicle, the method including: after a first vehicle ingress/egress event, via a controller, activating a sensor to capture a reference image of a portion of a vehicle body; after a second vehicle ingress/egress event via the controller, activating the sensor to capture a test image of the portion of the vehicle body; determining, via the controller, whether the test image includes one or more objects not found in the reference image; and releasing a door of the vehicle or producing a notification or prevent vehicle movement or some combination thereof, via the controller, based on the determination of whether the test image includes one or more objects not found in the reference image. Other embodiments of this aspect include corresponding computer systems, apparatus, and computer programs recorded on one or more computer storage devices, each configured to perform the actions of the methods.

Implementations may include one or more of the following features. The method further including: where, when it is determined that the test image includes one or more objects not found in the reference image, via the controller, accessing an image recognition database stored in a memory to recognize the one or more objects included in the test image; and releasing the vehicle door and/or producing the notification, via the controller, only when the one or more objects only included in the test image are recognized as a certain type. The method where the one or more objects included in the test image are recognized as a trapped portion of flexible material. The method where the determination of whether the test image includes one or more objects not found in the reference image is based on a comparison of the reference image and the test image. The method where: the step that occurs after the second vehicle ingress/egress event is redefined as activating the sensor to capture a plurality of test images of the portion of the vehicle body; and the determination step is redefined by whether the plurality of test images include one or more objects not found in the reference image; and the step in which the vehicle door is released and/or the notification is produced and/or vehicle movement is prevented is redefined by whether the plurality of test images include one or more objects not found in the reference image. The method where the sensor is a wide-angle camera and/or ultra-wide-angle camera. The method where the notification is a text message configured to be exhibited on a display located in the vehicle. The method where the notification is an at least temporary activation of a vehicle horn. Implementations of the described techniques may include hardware, a method or process, or computer software on a computer-accessible medium.

One general aspect includes a vehicle including: a body and a door adapted to releasably engage the body; a sensor positioned on the body and configured to capture an image of a location at which the body and door meet each other, when the door is releasably engaged with the body; a memory that is disposed onboard the vehicle and configured to include a program; a processor that is disposed onboard the vehicle and configured to execute the program, where the program enables the processor to: after a first vehicle ingress/egress event, activate the sensor to capture a reference image of the location at which the body and door meet; after a second vehicle ingress/egress event, activate the sensor to capture a test image of the location at which the body and door meet; determine whether the test image includes one or more objects not found in the reference image; and release the door from the body or produce a notification or prevent vehicle movement or some combination thereof, based on the determination of whether the test image includes one or more objects not found in the reference image. Other embodiments of this aspect include corresponding computer systems, apparatus, and computer programs recorded on one or more computer storage devices, each configured to perform the actions of the methods.

Implementations may include one or more of the following features. The vehicle further including: when it is determined that the test image includes one or more objects not found in the reference image, access an image recognition database stored in the memory to recognize the one or more objects included in the test image; and release the door and/or produce the notification only when the one or more objects included in the test image are recognized as a certain type. The vehicle where the one or more objects included in the test image are recognized as a portion of flexible material trapped at the location at which the body and door meet. The vehicle where the determination of whether the test image includes one or more objects not found in the reference image is based on a comparison of the reference image and the test image. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
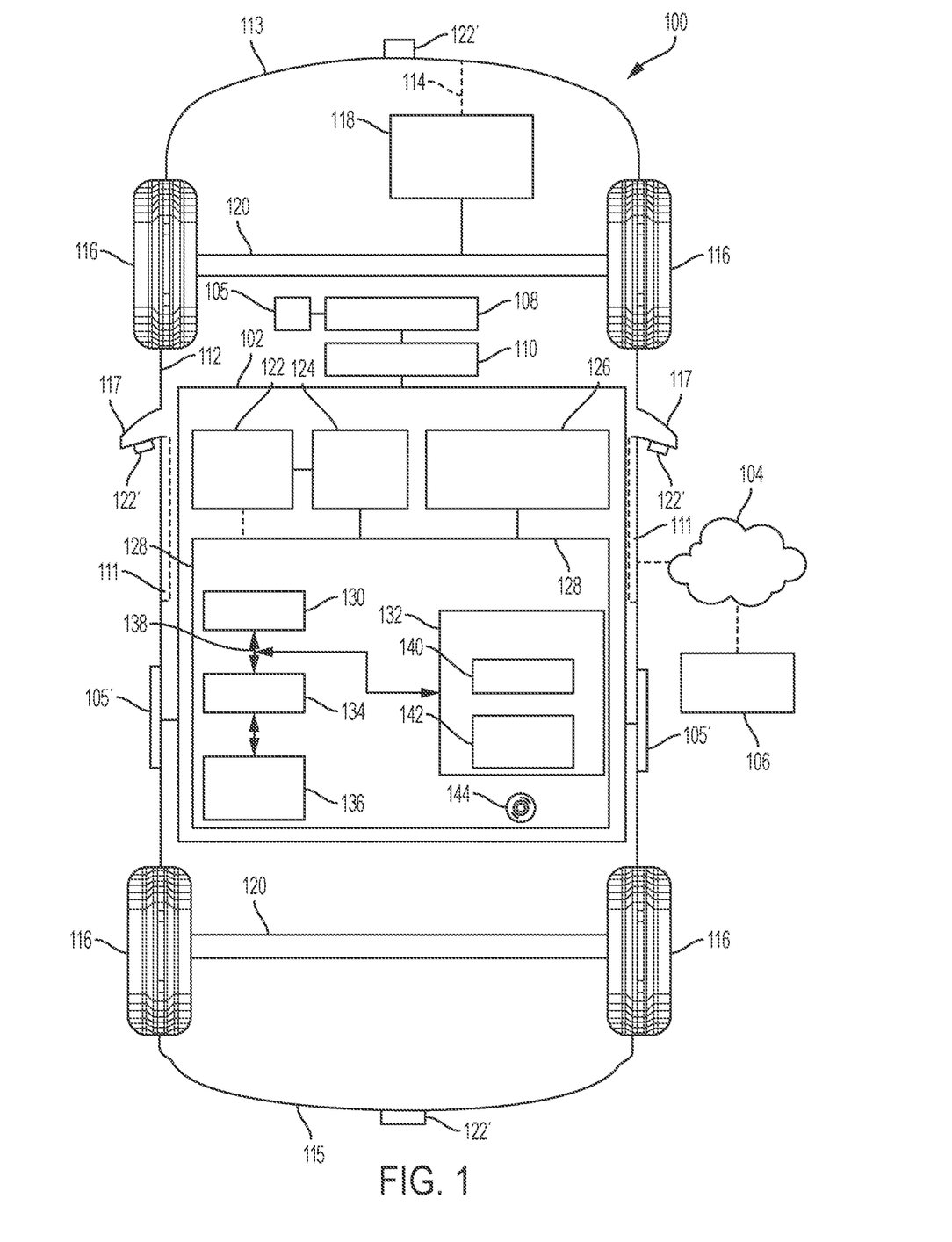
FIG. 1 is a functional block diagram of a vehicle that includes a control system for controlling and implementing a system and method to detect an occurrence of flexible material being trapped by components of a vehicle in accordance with one or more exemplary embodiments.

FIG. 1 illustrates a vehicle 100, according to an exemplary embodiment. As described in greater detail further below, the vehicle 100 includes a control system 102 for detecting the occurrence of flexible material being trapped by parts of vehicle 100. In various embodiments, the control system 102 facilitates communications between the vehicle 100 and a peer network 104 having various other participants 106. Also in various embodiments, the control system 102 is coupled to various vehicle modules 108 (e.g., braking control, engine control, transmission control, instrument pack, infotainment module, passive entry passive start module (PEPS module), body control module (BCM), audio system, lighting, climate control, and so on, in certain embodiments) via one or more vehicle buses 110 (e.g., one or more vehicle CAN buses, in certain embodiments).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems.

The vehicle 100 includes a body 112 that is arranged on a chassis 114. The body 112 substantially encloses other components of the vehicle 100 and includes a front bumper 113, back bumper 115 and side-view mirror casings 117. A door 111 is installed on the body 112 and can releasably engage with the a door frame of body 112. The body 112 and the chassis 114 may jointly form a frame. The vehicle 100 also includes a plurality of wheels 116. The wheels 116 are each rotationally coupled to the chassis 114 near a respective corner of the body 112 to facilitate movement of the vehicle 100. In one embodiment, the vehicle 100 includes four wheels 116, although this may vary in other embodiments (for example for trucks and certain other vehicles).

A drive system 118 is mounted on the chassis 114, and drives the wheels 116, for example via axles 120. The drive system 118 preferably comprises a propulsion system. In certain exemplary embodiments, the drive system 118 comprises an internal combustion engine and/or an electric motor/generator, coupled with a transmission thereof. In certain embodiments, the drive system 118 may vary, and/or two or more drive systems 118 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the control system 102 controls communications with the peer network 104, for example for use in performing actions respect to one or more modules 108 of the vehicle 100 (e.g., vehicle braking, engine control, transmission control, infotainment control, climate control, lighting control, audio system control, instrument control, and so on), among other vehicle actions. Also in various embodiments, the control system 102 is disposed within the body 112 of the vehicle 100. In one embodiment, the control system 102 is mounted on the chassis 114. In certain embodiments, the control system 102 and/or one or more components thereof may be disposed outside the body 112, for example, on a remote server, in the cloud, or in a remote smart phone or other device where image processing is performed remotely. In addition, in certain embodiments, the control system 102 may be disposed within and/or as part of the vehicle modules 108, drive system 118, and/or within and/or or as part of one or more other vehicle systems. Also, as depicted in FIG. 1, in various embodiments the control system 102 is coupled to the vehicle modules 108 via the vehicle communication bus 110, and is further coupled to the peer network 104.

As depicted in FIG. 1, the control system 102 includes various sensors 122, a sensor interface 124, a transceiver 126, and a controller 128. In various embodiments, the sensors 122 include cameras, radar sensors, infrared sensors, engine control sensors, and/or various other sensors pertaining to the various modules 108 and/or operation of the vehicle 100. In various embodiments, the cameras 122' are wide-angle cameras or ultra-wide-angle cameras and may be installed at various locations surrounding the body 112 such as, for example, the front bumper 113, back bumper 115 and side-view mirror casings 117. Also in various embodiments, the cameras 122' are positioned to provide a 360-degree view of the vehicle 100 and corresponding areas around the vehicle 100. As such, the cameras 122' can be angled such that at least a portion of the body 112 is contained in the image captured from the cameras 122'. For example, one or more portions of the captured images may include the locations on the body 112 at which both the vehicle 100's driver-side door 111 and driver-side door frame meet. Also in various embodiments, the sensor interface 124 facilitates communications between the sensors 122 and the controller 128.

In various embodiments, the transceiver 126 facilitates and provides communications between the vehicle 100 and the peer network 104. For example, in various embodiments, the transceiver 126 receives communications (e.g., including data pertaining to operation of the vehicle 100 and/or including recommendations for the vehicle 100) from the peer network 104 (e.g., from one or more other participants 106 of the peer network 104 such as, for example, remote mobile computing devices including smart phones, tablets, wearable devices and the like), and also provides communications from the vehicle 100 to the peer network 104. In certain embodiments, the transceiver 126 may also receive, provide, and/or facilitate communications between the controller 128 and the sensors 122 and/or vehicle modules 108. In various embodiments, the transceiver 126 may include a single transceiver and/or multiple transceivers, and may include one or more similar devices such as one or more receivers, transmitters, and/or communication modules (which will collectively be referred to as a "transceiver" for the purposes of this Application).

In various embodiments, as is generally known, the BCM 108 governs various electrical components located throughout the vehicle, like the vehicle's power door locks, haptic feedback devices, headlights, and horn system (which is configured to generate various audible warnings—as is generally known). In various embodiments, as is generally known, the PEPS module 108 provides passive detection of the absence or presence of a passive physical keyfob or virtual keyfob uploaded onto a smart device such as a smart phone or tablet computer. When the passive physical keyfob/virtual keyfob approaches, the PEPS module can determine if the fob is authentic as belonging to the vehicle 12. If the keyfob is deemed authentic, the PEPS module 108 can send a command to BCM 108 permitting access to the vehicle 100. In various embodiments, as is generally known, the infotainment module 108 includes a graphics display 105, such as a touch screen on the instrument panel or a heads-up display reflected off of the windshield, and can be used to provide a multitude of input and output functions (i.e., capable of GUI implementation). The infotainment module 108 may also be similarly connected to one or more graphics displays 105' located on the exterior side of body 112. Audio system 108 provides audio output to a vehicle occupant and can be a dedicated, stand-alone system or part of the primary vehicle audio system.

The controller 128 controls operation of the control system 102, and the communications with the peer network 104. In various embodiments, the controller 128 is coupled to the sensors 122 (e.g., via the sensor interface 124), the transceiver 126, the vehicle modules 108 (e.g., via the vehicle bus 110), and to the peer network 104. In various embodiments, the control system 102 receives data from the sensors 122, the vehicle modules 108, and the peer network 104, processes the data, controls vehicle actions using the data via the vehicle modules 108, and controls the vehicle 100's communications with the peer network 104. In various embodiments, the controller 128 provides these and other functions in accordance with the steps of the processes discussed further below in connection with FIGS. 2 and 3.

Also in one embodiment, the controller 128 is disposed within the control system 102, within the vehicle 100. In certain embodiments, the controller 128 (and/or components thereof, such as the processor 130 and/or other components) may be part of and/or disposed within one or more other vehicle components. Also in certain embodiments, the controller 128 may be disposed in one or more other locations of the vehicle 100. In addition, in certain embodiments, multiple controllers 128 may be utilized. In addition, in certain embodiments, the controllers 128 can be placed outside the vehicle, such as in a remote server, in the cloud or on a remote smart device.

As depicted in FIG. 1, the controller 128 comprises a computer system. In certain embodiments, the controller 128 may also include one or more of the sensors 122, the transceiver 126, one or more components thereof, and/or one or more other components of the vehicle 100. In addition, it will be appreciated that the controller 128 may otherwise differ from the embodiment depicted in FIG. 1. For example, the controller 128 may be coupled to or may otherwise utilize one or more remote computer systems and/or other control systems, for example as part of one or more of the above-identified vehicle 100 devices and systems.

In the depicted embodiment, the computer system of the controller 128 includes a processor 130, a memory 132, an interface 134, a storage device 136, and a bus 138. The processor 130 performs the computation and control functions of the controller 128, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 140 contained within the memory 132 and, as such, controls the general operation of the controller 128 and the computer system of the controller 128, generally in executing the processes described herein, such as the processes discussed further below in connection with FIGS. 2 and 3. While the processor 130 is depicted in FIG. 1 as being part of the controller 128, it will be appreciated that in certain embodiments the processor 130 (and/or one or more additional processors) may also be part of various other vehicle components, such as (by way of example) one or more vehicle modules 108 (e.g., an engine control unit), sensors 122, drive system 118, transceiver 126, and so on.

The memory 132 can be any type of suitable memory. For example, the memory 132 may include various types of dynamic random access memory (DRAM) such as SDRAM, the various types of static RAM (SRAM), and the various types of non-volatile memory (PROM, EPROM, and flash). In certain examples, the memory 132 is located on and/or co-located on the same computer chip as the processor 130. In the depicted embodiment, the memory 132 stores the above-referenced program 140 along with one or more stored values 142.

The bus 138 serves to transmit programs, data, status and other information or signals between the various components of the computer system of the controller 128. The interface 134 allows communication to the computer system of the controller 128, for example from a system driver and/or another computer system, and can be implemented using any suitable method and apparatus. In one embodiment, the interface 134 obtains the various data from the sensors 122, vehicle modules 108, and/or transceiver 126. The interface 134 can include one or more network interfaces to communicate with other systems or components. The interface 134 may also include one or more network interfaces to communicate with technicians, and/or one or more storage interfaces to connect to storage apparatuses, such as the storage device 136.

The storage device 136 can be any suitable type of storage apparatus, including various different types of direct access storage and/or other memory devices. In one exemplary embodiment, the storage device 136 comprises a program product from which memory 132 can receive a program 140 that executes one or more embodiments of one or more processes of the present disclosure, such as those set forth in FIGS. 2 and 3 and discussed below. In another exemplary embodiment, the program product may be directly stored in and/or otherwise accessed by the memory 132 and/or a disk (e.g., disk 144), such as that referenced below.

The bus 138 can be any suitable physical or logical means of connecting computer systems and components. This includes, but is not limited to, direct hard-wired connections, fiber optics, infrared and wireless bus technologies. During operation, the program 140 is stored in the memory 132 and executed by the processor 130.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 130) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 128 may also otherwise differ from the embodiment depicted in FIG. 1, for example in that the computer system of the controller 128 may be coupled to or may otherwise utilize one or more remote computer systems and/or other control systems.

METHOD

Figure 2:
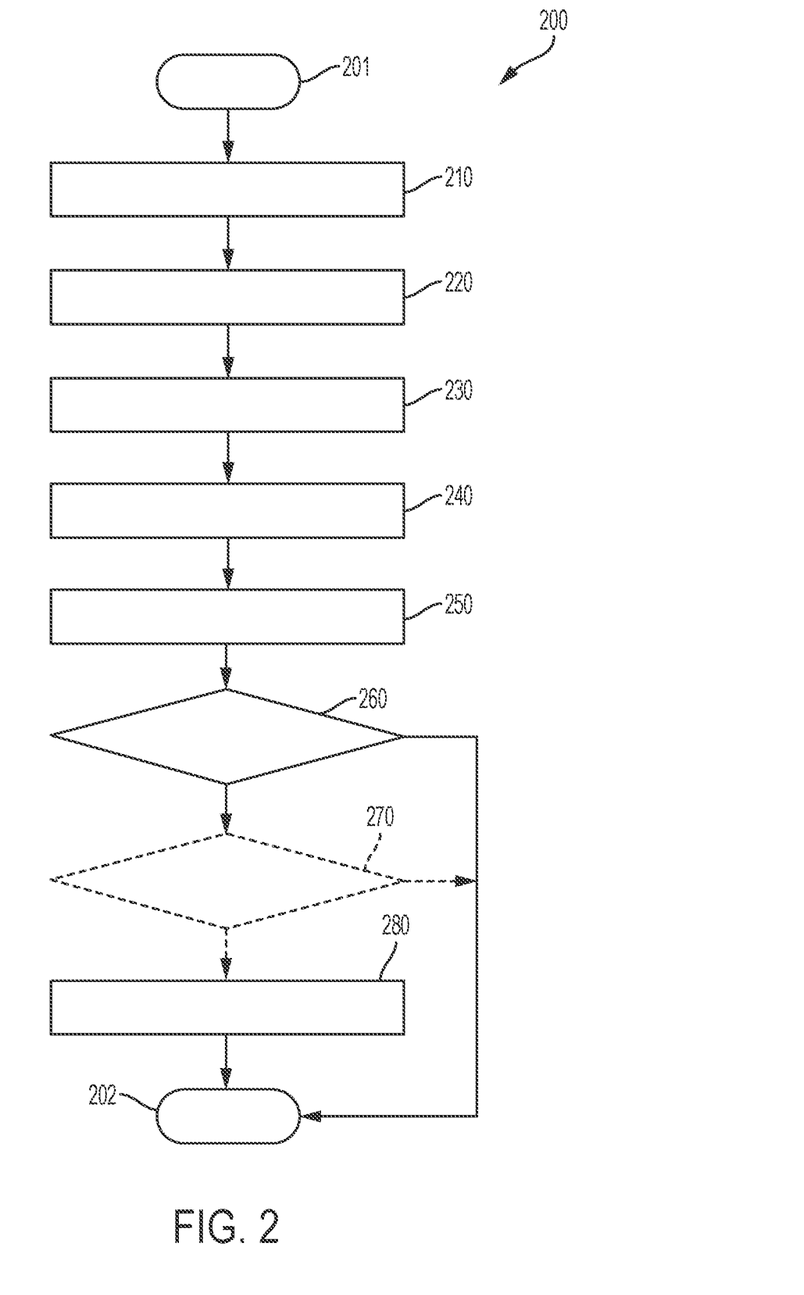
FIG. 2 is a flowchart of an exemplary process for detecting the occurrence of flexible material being trapped by parts of vehicle in accordance with one or more exemplary embodiments.

Now turning to FIG. 2, there is shown an embodiment of a method 200 to detect the occurrence of flexible material being trapped between the door 111 and body 112 of vehicle 100 when a user is entering the vehicle's cabin (an ingress event). One or more aspects of detection method 200 may be completed through control system 102 which may include one or more programs 140 contained in memory 132 and carried out by controller 128. One or more ancillary aspects of method 200 may be completed by sensors 122 (such as, for example, the cameras 122'), the vehicle modules 108 (e.g., infotainment module, BCM, and/or PEPS module), a database stored in memory 132, graphical display 105, and door 111. Method 200 is supported by the BCM 108 being configured to establish a short range wireless communication protocol (SRWC protocol) with a vehicle key fob when the fob is within proximity of vehicle 100. Method 200 is also supported by the BCM 108 being configured to cause the power door locks to unlock the door 111 as well as release the door latch and cause the door to open. Method 200 is also supported by BCM 108 being configured to activate one or more haptic feedback devices. Method 200 is also supported by the infotainment module 108 being configured to cause graphics module 105 to display information. Method 200 is also supported by audio system 108 being configured to generate an audible warning. Method 200 is also supported by the drive system 118 (and, in certain embodiments, one or more other engine control system modules 108) being configured to activate and deactivate the vehicle's propulsion system (i.e., to cause and prevent vehicle movement). These configurations may be established by a manufacturer at or around the time of the vehicle's assembly. The method 200 is further yet supported by preconfiguring infotainment module to exhibit information such as notifications on its graphics display.

Method 200 begins at 201 in which the user comes into proximity of vehicle 100. In essence, method 200 begins when the user is close enough to vehicle 100 to establish a SRWC between one or more of the vehicle modules 108 (e.g., PEPS modules or BCM) and a passive physical keyfob or virtual keyfob ("keyfob") on the person of the user. Moreover, the SRWC protocol may be, for example, Bluetooth, BLE, or Wi-Fi.

In step 210, the user triggers a first ingress event. In various embodiments, this event occurs when the PEPS module 108 recognizes the presence of the keyfob to be in proximity of vehicle 100 (e.g., within a range of 10 feet) and verifies the device to be a match for vehicle 100. In various embodiments, alternatively, this event occurs when the user indicates desires access to the vehicle 100. For example, when the user presses a physical/virtual button on their keyfob to command the vehicle 100 to unlock one or more of its doors 111. In this step, moreover, upon sensing the presence of the keyfob or receiving a keyfob command, the PEPS module 108 can send a command to BCM to permit access to the vehicle 100 (e.g., unlock the one or more vehicle doors 111).

In step 220, controller 128 will wake up the cameras 122' installed at various locations around the body 112. As such, power from the vehicle's battery (not shown) will be provided to these cameras 122' so they are enabled to be activated and capture one or more images. In step 230, the controller 128 will activate the camera 122' installed on the side-view mirror casing 117 which is adjacent to the driver-side door. With additional reference to FIG. 3A, the controller 128 will moreover cause the camera 122' to capture an image of where the driver-side door 111 and driver-side door frame 112 meet each other (when the driver-side door 111 is hingedly/slidably closed and has thus engaged with the door frame 112). For example, the camera 122' may capture an image of the bottom and one or more sides of the door trim while the door 111 is closed. In various embodiments, the controller 128 may alternatively or simultaneously activate another camera 122' installed on the side-view mirror casing 117 located near the passenger-side door to capture an image of the door trim of that door 111 while closed. In various embodiments, a light sensor 122 may detect whether it is day or night in the vehicle environment. When it is determined that it is night outside, controller 128 may activate approach lighting to illuminate the exterior surface of body 112 prior to the camera(s) capturing its image. It should be understood that this captured image or images should be considered a "reference image" or "reference images."

In step 240, the user opens the vehicle door 111 and enters the vehicle 100. Moreover, in this step, the user closes the vehicle door 100 to trigger a second ingress event upon the door latch signaling to the controller 128 that the door has properly shut closed. Alternatively, the second ingress event can occur when the controller 128 is signaled that the user has activated the vehicle 100 by shifting the vehicle 100 into the drive or reverse gear to begin vehicle operations.

Figure 3A:
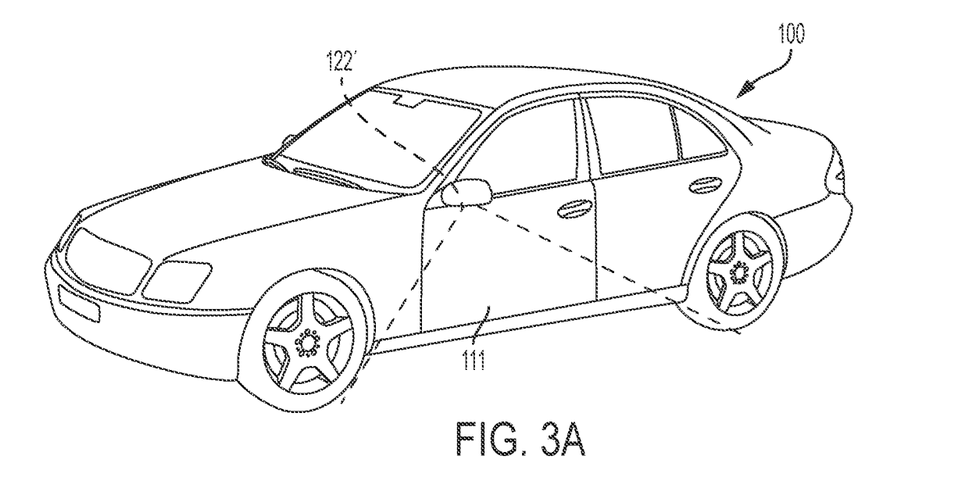
FIG. 3A depicts an application of an exemplary aspect of the process of FIG. 2 in accordance with one or more exemplary embodiments.
Figure 3B:
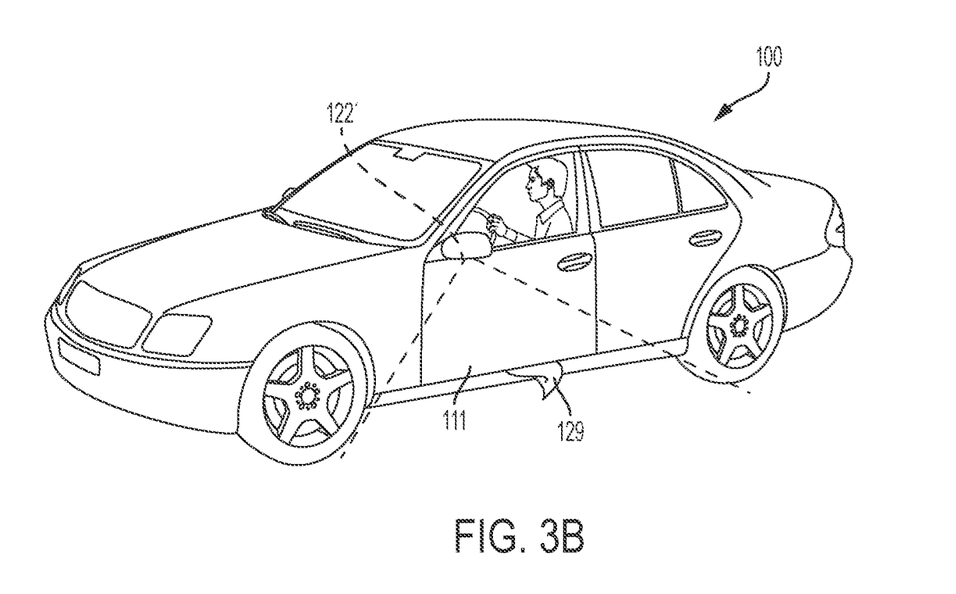
FIG. 3B depicts an application of another exemplary aspect of the process of FIG. 2 in accordance with one or more exemplary embodiments.

In step 250, with additional reference to FIG. 3B, shortly after this second ingress event (e.g., after the door closes but before the vehicle begins to move), the controller 128 will reactivate the driver-side door camera 122' (previously activated in step 230) and capture a second image of the spots where the driver-side door 111 and driver-side door frame 112 meet each other. In various embodiments, the controller 128 may alternatively or simultaneously activate another camera 122' located near the passenger-side door to capture an image of that door trim. It should be understood that this second captured image (or second set of captured images) should be considered a "test image" or "test images."

Figure 4A:
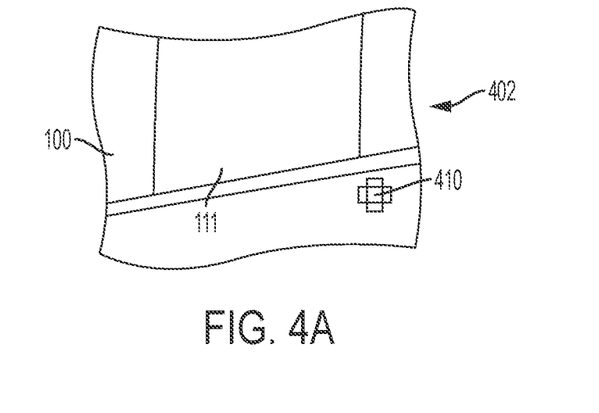
FIG. 4A depicts an application of an exemplary aspect of the process of FIG. 2 in accordance with one or more exemplary embodiments.
Figure 4B:
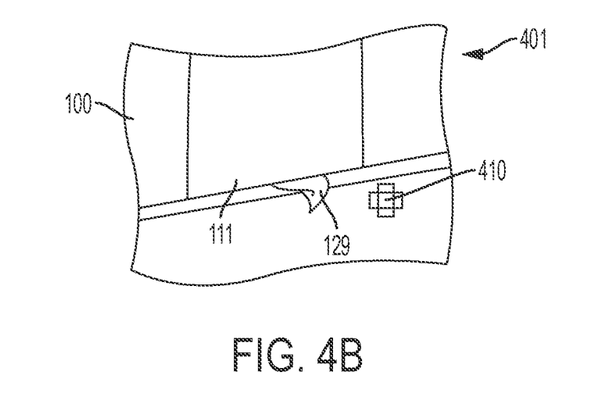
FIG. 4B depicts an application of another exemplary aspect of the process of FIG. 2 in accordance with one or more exemplary embodiments.

In step 260, with additional reference to FIGS. 4A and 4B, controller 128 will perform one or more generally known object detection techniques to determine whether the user's clothing (e.g., the end of a long dress or rain coat) has, in some fashion, been trapped by the door 111 and door frame 112. For example, controller 128 can perform this image analysis by comparing the test image 401 to the reference image 402 at the pixel level to determine if the test image includes an object not found in the reference image. Thus, since the scene in the captured images should be static and the images are captured close in time, the reference and test images should be identical unless clothing 129 has been wedged between the door 111 and frame 112. If clothing 129 is found to be wedged in the door, then the pixels 410 in the area where the clothing is found will have different characteristics such as, for example, different color and intensity. As follows, when a certain number of pixels 410 clumped together in a concentrated area of the test image 401 are found to have unique characteristics not seen in the reference image 402 (e.g., at and below the bottom of the door trim), these differences would indicate fabric is jammed between the door 111 and respective door frame 112. Furthermore, if the test image 401 includes an object not found in the reference image, method 200 can move to optional step 270; otherwise, method 200 will move to completion 202. It should be understood that only one pixel cluster 410 can be seen in the reference image 402 and test image 401, however, skilled artists will understand that the entire area of these images will comprise pixels.

In optional step 270, controller 128 performs one or more generally known deep learning approaches to recognize the objects included in the test image. For instance, controller 128 can access an image recognition database from memory 132 which is filled with training data that can be a number of sample images depicting a piece of clothing (i.e., flexible material) stuck between a car door 111 and door frame 112. Moreover, controller 128 can then search this database for a sample image that depicts an object of similar characteristics (size, color, pattern, shape, etc.) to the unique object discovered in the test image. If the search uncovers a sample image including an object of identical or nearly identical characteristics to the object found in the test image, then the object in the test image will be recognized as trapped clothing and method 200 will move to step 280. After such a determination, controller 128 may also provide the test image to the image recognition database, to be added to the training data. If the search cannot find a sample image with an object like the one found in the test image, however, controller 128 will determine that the object detection technique has produced a false positive and method 200 will move to completion 202. An example of a false positive would be when a tree leaf has somehow been stuck to the door 111 sometime between the capturing of the reference and test image.

In step 280, controller 128 will produce a notification which is exhibited on the internal graphical display 105 of the infotainment module 108. This notification may be embodied as a visible text message stating "WARNING: CHECK DOOR FOR TRAPPED CLOTHING" or the like. Controller 128 may also transmit this notification to a known remote computing device such as, for example, a smart phone (not shown) via the peer network 104, to be displayed on the user interface of that computing device. The notification may also include a supporting audible warning from the audio system 108 such as, for example, chirps or dings (e.g., via an electronic/software chime module within the audio system). The notification may further/alternatively include a supporting haptic feedback warning from one or more vibratory devices (e.g., a piezo-electric device) installed in the driver seat or one or more passenger seats or steering wheel. Controller 128 may also collaborate with the BCM 108 to cause the door 111 to be released from the door fame (i.e., by sequentially unlocking and unlatching and rotating away or sliding open the door 111). In addition, controller 128 may also collaborate with the drive system 118 and (one or more other engine control system modules 108) to prevent activation of or deactivate the vehicle's propulsion system until the trapped fabric has been released (e.g., after controller 128 has sensed door 111 has opened and closed and one or more new test images have been produced). In this way, controller 128 will prevent vehicle movement from occurring until the trapped fabric has been released. Alternatively, when vehicle 100 is embodied as an autonomous vehicle, controller 128 may also collaborate with drive system 118 to prevent automated vehicle departure. It should be understood that, in certain embodiments, the controller 128 may also cause door 111 to be released and opened and/or prevent vehicle movement without additionally producing a notification. After step 280, method 200 moves to completion 202.

Figure 5:
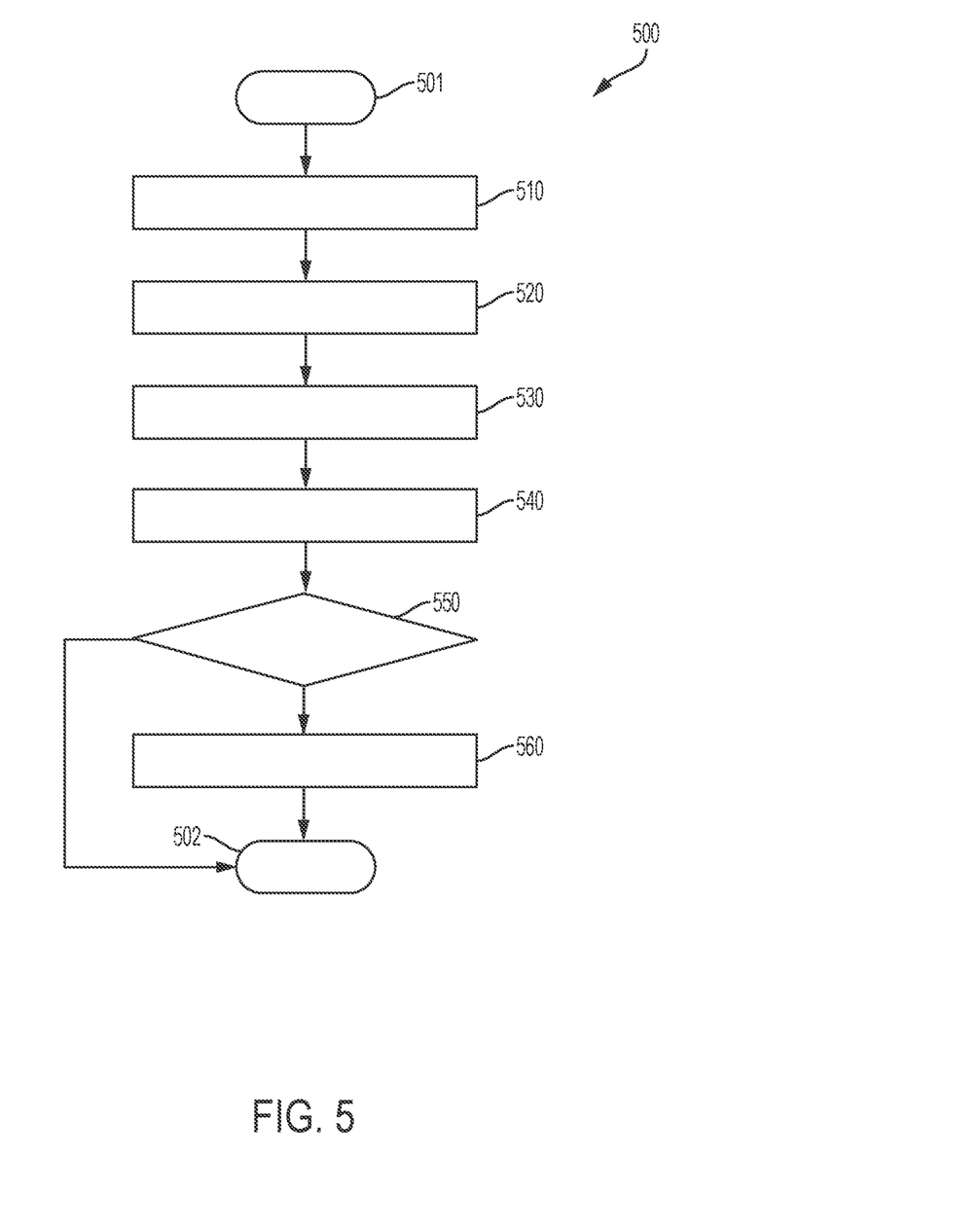
FIG. 5 is a flowchart of another exemplary process for detecting the occurrence of flexible material being trapped by parts of vehicle in accordance with one or more exemplary embodiments.

Now turning to FIG. 5, there is shown an embodiment of a method 500 to detect the occurrence of flexible material being trapped between the door 111 and body 112 of vehicle 100 when a user is exiting the vehicle's cabin (an egress event). One or more aspects of detection method 500 may be completed through control system 102 which may include one or more programs 140 contained in memory 132 and carried out by controller 128. One or more ancillary aspects of method 400 may be completed by sensors 122 (such as, for example, the cameras 122'), the vehicle modules 108 (e.g., infotainment module, BCM, and/or PEPS module), graphical display 105', and door 111. Method 500 is also supported by audio system 108 being configured to generate an audible warning. Method 200 is also supported by the infotainment module 108 being configured to cause interior graphics display 105 and/or exterior graphics display 105' to display information. Method 500 is also supported by the drive system 118 (and, in certain embodiments, one or more other engine control system modules 108) being configured to activate and deactivate of the vehicle's propulsion system (i.e., to cause and prevent vehicle movement). The method 500 is further yet supported by preconfiguring the BCM 108 to govern the vehicle horn system and cause the horn to produce an audible alarm as well as cause the power door locks to unlock the door 111 as well as release the door latch and cause the door to open. These configurations may be established by a manufacturer at or around the time of the vehicle's assembly.

Method 500 begins at 501 in which the user is positioned in the interior cabin of vehicle 100 and preparing to exit from the vehicle. For example, when the user has completed a trip and is ready to leave their vehicle 100. In step 510, the user triggers a first egress event. In various embodiments, this event occurs when the user pulls a door latch to release the door 111 from being engaged with the doorframe 112 and thus open the door 111. In step 520, if not already awake, controller 128 will wake up the cameras 122' installed at positions around the body 112. In addition, in this step, prior to the door 111 opening and being hingedly rotated away from body 112 (or, in certain embodiments, the door 111 opening by sliding along the side of body 112 via rails, or some other known manner of opening door 111) the controller 128 will activate the camera 122' installed on the side-view mirror casing 117 which is adjacent to the driver-side door (see FIG. 3A). The controller 128 will moreover cause the camera 122' to capture an image of where the driver-side door 111 and driver-side door frame 112 meet each other (while the driver-side door 111 is still hingedly/slidably closed and has thus engaged with the door frame 112). For example, as explained above, the camera 122' may capture an image of the bottom and one or more sides of the door trim while the door 111 is closed. In various embodiments, the controller 128 may alternatively or simultaneously activate the camera 122' installed on the side-view mirror casing 117 located near the passenger-side door to capture an image of the door trim of that door 111 while closed. When it is dark outside, as discussed above, controller 128 may activate the vehicle's approach lighting to illuminate the body 112 and make it easier for clarity of the captured image. It should be understood that this captured image or images should be considered a "reference image" or "reference images", similar to those discussed above in method 200.

In step 530, the user opens door 111 by operatively rotating the door 111 away from body 112 (or having the door 111 automatically slide along the body 112 via rails) and exits out of the vehicle 100. Moreover, in this step, after fully leaving the vehicle, the user properly closes the door 111 behind themselves (or the door will automatically slide closed) such that it will trigger a second egress event upon the door latch signaling to the controller 128 that the door has properly shut closed. In step 540, upon the second egress having been triggered, the controller 128 will reactivate the driver-side door camera 122' (previously activated in step 520) and capture multiple secondary images of the spots where the driver-side door 111 and driver-side door frame 112 meet each other. These images may be captured over a time duration such as, for example, one fourth (0.25) to one half (0.5) of a second in length. In various embodiments, the controller 128 may alternatively or simultaneously activate the camera 122' located near the passenger-side door to capture multiple images of that door trim. It should be understood that this secondary set of captured images are considered "test images", similar to those discussed above in method 200.

In step 550, controller 128 will perform one or more generally known object detection techniques to determine whether the user's clothing (e.g., the end of a long dress or rain coat) has been trapped by the door 111 and door frame 112 in some fashion. For example, controller 128 can perform this image analysis by comparing the series of test images (see FIG. 4A) to the reference image (see FIG. 4B) at the pixel level to determine if the test images include an object not found in the reference image. Thus, since the scene in the captured images should be static and the reference image and each test image are captured close in time, the reference and test images should be identical unless clothing has been wedged between the door 111 and respective frame 112. If this is the case, then the pixels in the area where the clothing is found to be wedged will have different characteristics such as, for example, different color and intensity. As follows, if a certain number of pixels, clumped together in a substantially similar manner in each of the test images, are found to be of different characteristics than the pixels in that area of the reference image (e.g., at and below the bottom of the door trim), then the difference between the combined test images and reference image would indicate fabric is jammed between the door 111 and respective door frame 112. Furthermore, if the test images include a substantially identical object not found in the reference image, method 500 can move to step 560; otherwise, method 500 will move to completion 502.

This object detection technique may be better understood as a consecutive image frame analysis and may be understood as being particularly more reliable and applicable determination for method 500 (i.e., for vehicle egress), than comparing a single test image to a single reference image. This is because fabric, being a flexible material, may press against the door 111 (e.g., due to wind or some other weather condition) for a moment and seem trapped when it is not actually trapped and thus produce a false positive of the object detection analysis. Capturing multiple test images would make it harder to produce this false positive since the fabric will move over time and thus appear different in each test image. As follows, if one or more test images shows a clump of pixels that are not shown or different than one or more other test images, it will be determined that these differences do not actually indicate fabric has been jammed between the door 111 and respective door frame 112. Controller 128 may also activate the approach lighting before or during the capturing of the images to enhance image clarity in one or more of the test images. Additionally, in this step, controller 128 can perform one or more generally known deep learning approaches, discussed above, to recognize the unique objects included in one or more of the captured test images for verification purposes (e.g., by accessing an image recognition database).

In step 560, controller 128 will produce a notification which is an audible warning produced through the vehicle's horn system. This notification may be embodied as numerous horn chirps which may be heard by the user being within a few feet of the vehicle 100. In various embodiments, the notification may also include a supporting audible warning from the audio system 108 (e.g., chirps or dings) and, in various embodiments, this notification may also include a supporting visible text message that is displayed on the graphical display 105 of the infotainment module 108 and/or the exterior graphics display 105'. Controller 128 may also transmit the visible text message notification to a known remote computing device such as, for example, a smart phone (not shown) via the peer network 104, to be displayed on the user interface of that computing device. Controller 128 may also collaborate with the BCM 108 to cause the door 111 to be released from the door fame (i.e., by sequentially unlocking and unlatching the door 111) so as to release the trapped fabric between the door 111 and door frame. In addition, controller 128 may also collaborate with the drive system 118 (or more other engine control system modules 108) to prevent activation of or deactivate the vehicle's propulsion system until the trapped fabric has been released (e.g., after controller 128 has sensed door 111 has opened and closed and one or more new test images have been produced). In this way, controller 128 will prevent vehicle movement until the trapped fabric has been released. Alternatively, when vehicle 100 is embodied as an autonomous vehicle, controller 128 may also collaborate with drive system 118 to prevent automated vehicle departure. It should be understood that, in certain embodiments, the controller 128 may also cause door 111 to be released and/or prevent vehicle movement without also producing a notification. After step 560, method 500 moves to completion 502.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to detect an occurrence of flexible material being trapped by a vehicle, the system comprising:

a memory configured to comprise a program and a processor configured to execute the program, wherein the program enables the processor to:

after a first vehicle ingress/egress event, activate a sensor to capture a reference image of a portion of a vehicle body;

after a second vehicle ingress/egress event, activate the sensor to capture a test image of the portion of the vehicle body;

determine whether the test image includes one or more objects not found in the reference image; and release a door of the vehicle or produce a notification or prevent vehicle movement or some combination thereof, based on the determination of whether the test image includes one or more objects not found in the reference image, wherein, when it is determined that the test image includes one or more objects not found in the reference image, access an image recognition database stored in the memory to recognize the one or more objects included in the test image; and release a door of the vehicle or produce a notification or prevent vehicle movement or some combination thereof only when the one or more objects only included in the test image are recognized as a certain type, and wherein the one or more objects included in the test image are recognized as a trapped portion of flexible material.

2. The system of claim 1, wherein the determination of whether the test image includes one or more objects not found in the reference image is based on a comparison of the reference image and the test image.

3. The system of claim 1, wherein:
the step that occurs after the second vehicle ingress/egress event is redefined as activate the sensor to capture a plurality of test images of the portion of the vehicle body; and
the determination step is redefined by whether the plurality of test images include one or more objects not found in the reference image; and
the step in which the vehicle door is released and/or the notification is produced and/or vehicle movement is prevented is redefined by whether the plurality of test images include one or more objects not found in the reference image.

4. The system of claim 1, wherein the sensor is a wide-angle camera or ultra-wide-angle camera.

5. The system of claim 1, wherein the notification is a text message configured to be exhibited on a display located in the vehicle.

6. The system of claim 1, wherein the notification is an at least temporary activation of a vehicle horn.

7. A method to detect an occurrence of flexible material being trapped by a vehicle, the method comprising:
after a first vehicle ingress/egress event, via a controller, activating a sensor to capture a reference image of a portion of a vehicle body;
after a second vehicle ingress/egress event via the controller, activating the sensor to capture a test image of the portion of the vehicle body;
determining, via the controller, whether the test image includes one or more objects not found in the reference image; and
releasing a door of the vehicle or producing a notification or prevent vehicle movement or some combination thereof, via the controller, based on the determination of whether the test image includes one or more objects not found in the reference image, wherein, when it is determined that the test image includes one or more objects not found in the reference image, via the controller, accessing an image recognition database stored in a memory to recognize the one or more objects included in the test image; and release a door of the vehicle or produce a notification or prevent vehicle movement or some combination thereof only when the one or more objects only included in the test image are recognized as a certain type, and wherein the one or more objects included in the test image are recognized as a trapped portion of flexible material.

8. The method of claim 7, wherein the determination of whether the test image includes one or more objects not found in the reference image is based on a comparison of the reference image and the test image.

9. The method of claim 7, wherein:
the step that occurs after the second vehicle ingress/egress event is redefined as activating the sensor to capture a plurality of test images of the portion of the vehicle body; and
the determination step is redefined by whether the plurality of test images include one or more objects not found in the reference image; and
the step in which the vehicle door is released and/or the notification is produced and/or vehicle movement is prevented is redefined by whether the plurality of test images include one or more objects not found in the reference image.

10. The method of claim 7, wherein the sensor is a wide-angle camera and/or ultra-wide-angle camera.

11. The method of claim 7, wherein the notification is a text message configured to be exhibited on a display located in the vehicle.

12. The method of claim 7, wherein the notification is an at least temporary activation of a vehicle horn.

13. A vehicle comprising:
a body and a door adapted to releasably engage the body;
a sensor positioned on the body and configured to capture an image of a location at which the body and door meet each other, when the door is releasably engaged with the body;
a memory that is disposed onboard the vehicle and configured to comprise a program;
a processor that is disposed onboard the vehicle and configured to execute the program, wherein the program enables the processor to:
after a first vehicle ingress/egress event, activate the sensor to capture a reference image of the location at which the body and door meet;
after a second vehicle ingress/egress event, activate the sensor to capture a test image of the location at which the body and door meet;
determine whether the test image includes one or more objects not found in the reference image; and
release the door from the body or produce a notification or prevent vehicle movement or some combination thereof, based on the determination of whether the test image includes one or more objects not found in the reference image, wherein, when it is determined that the test image includes one or more objects not found in the reference image, access an image recognition database stored in the memory to recognize the one or more objects included in the test image; and release a door of the vehicle or produce a notification or prevent vehicle movement or some combination thereof only when the one or more objects included in the test image are recognized as a certain type, and wherein the one or more objects included in the test image are recognized as a portion of flexible material trapped at the location at which the body and door meet.

14. The vehicle of claim 13, wherein the determination of whether the test image includes one or more objects not found in the reference image is based on a comparison of the reference image and the test image.

* * * * *